United States Patent [19]

Neer

[11] Patent Number: 5,560,707
[45] Date of Patent: Oct. 1, 1996

[54] TAMPER RESISTANT CONNECTOR ASSEMBLY

[75] Inventor: Donald A. Neer, Urbana, Ohio

[73] Assignee: Grimes Aerospace Company, Urbana, Ohio

[21] Appl. No.: 319,880

[22] Filed: Oct. 7, 1994

[51] Int. Cl.[6] .................................................. F21V 15/00
[52] U.S. Cl. ...................... 362/376; 362/374; 362/375; 362/440; 215/218
[58] Field of Search ........................... 215/217, 223; 362/374, 375, 376, 434, 440, 445, 455

[56] References Cited

U.S. PATENT DOCUMENTS

| | | | |
|---|---|---|---|
| 1,029,356 | 6/1912 | Frederick | 362/440 |
| 3,567,058 | 6/1971 | Mascia | 215/223 |
| 4,520,435 | 5/1985 | Baldwin | 362/455 |
| 5,377,087 | 12/1994 | Yoon | 362/374 |

*Primary Examiner*—Denise L. Gromada
*Assistant Examiner*—Alan B. Cariaso
*Attorney, Agent, or Firm*—Standley & Gilcrest

[57] ABSTRACT

The present invention provides a connector that is tamper resistant, yet does not require the use of tools. In one embodiment, a bezel retainer is designed to snap and lock into a lamp housing assembly by using tabs on the bezel retainer that lock into slots molded into the housing. The bezel retainer is maintained in position by a wave spring washer mounted in the housing. Tabs on the wave spring sit in detents on the end of the bezel retainer. The bezel is attached to the end of the bezel retainer and is allowed to rotate freely.

10 Claims, 5 Drawing Sheets

TAMPER RESISTANT CONNECTOR ASSEMBLY

BACKGROUND AND SUMMARY OF THE INVENTION

The present invention relates generally to the art of connectors and more particularly to an arrangement for airline passenger reading lamps that deters tampering by unqualified personnel.

Airlines and airplane manufacturers have attempted to please their passengers by providing passenger reading lamps. These lamps allow a passenger to light an area in front of him while the passenger cabin lights have been dimmed, without disturbing neighboring passengers. The light is sufficient to allow the passenger to read.

A problem inherent in the provision of reading lamps is the maintenance of the lamps. Lamp bulbs burnout and require replacement. Airlines desire a method that makes it easy for maintenance personnel to remove and replace the lamp, while not readily removable by children or other passengers. Attempts at solving this problem have ranged from the provision of a specialized tool to remove the lamp to an extremely simple method of removal. The specialized tool approach risks a loss of the tool that completely bars replacement of the lamp until another tool is found. The simple manual method allows a simple method of removal for not only the airline employee but also passengers, such as children. A need exists to provide a reading lamp that prevents tampering yet allows for easy lamp replacement by qualified personnel.

The present invention provides an assembly that may be used with a reading lamp to make it tamper resistant, yet does not require the use of tools. In one embodiment, a bezel of the present invention is designed to snap and lock into a housing assembly by using preferably four molded tabs on a bezel retainer that locks or is similarly secured into slots molded into the lamp housing. The bezel retainer is maintained in position, preferably by a wave spring washer mounted in the housing. The spring has tabs that snap into premolded detents on the top of the bezel retainer.

The bezel rotates freely to prevent the removal of the bezel assembly by unauthorized personnel. The method of removal of the bezel assembly for relamping is not obvious to those having no prior experience with the invention and thus reduces or eliminates tampering.

Removal of the bezel assembly may be accomplished by grasping and squeezing the bezel and bezel retainer with a thumb and forefinger. The bezel assembly is then rotated to disconnect the spring tabs from the bezel retainer detents and to remove the tabs from the slots. Installation is simply the reverse of this procedure.

It is to be appreciated that the present invention is not limited to use only on airline reading lamps. The present invention may be used in countless applications where a tamper resistant means of connecting is needed. As an example, tamper resistant containers for pharmaceutical products are quite popular and the present invention is useful in connecting the top of a container to the container receptacle. In this application the top or lid of the container is configured and analogously to the bezel, while the container receptacle is configured analogously to the bezel retainer.

Other principal features and advantages of the invention will become apparent to those skilled in the art upon review of the following detailed description, claims and drawings.

DETAILED DESCRIPTION OF PREFERRED EMBODIMENTS

Figure 1:
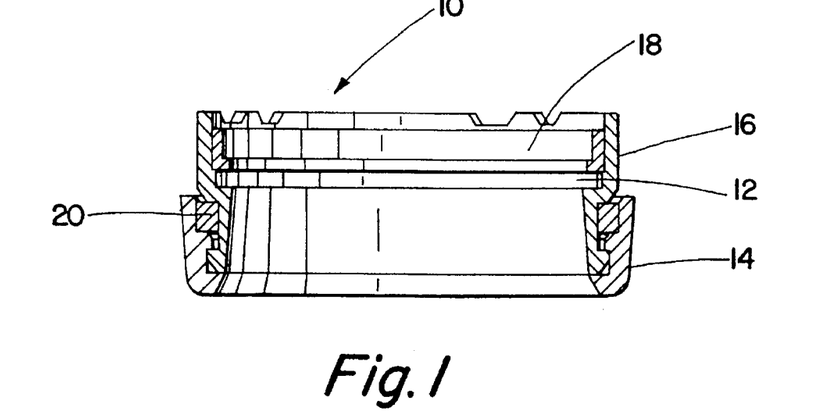
FIG. 1 is a cross-sectional view of a connector assembly of one embodiment of the present invention.
Figure 2:
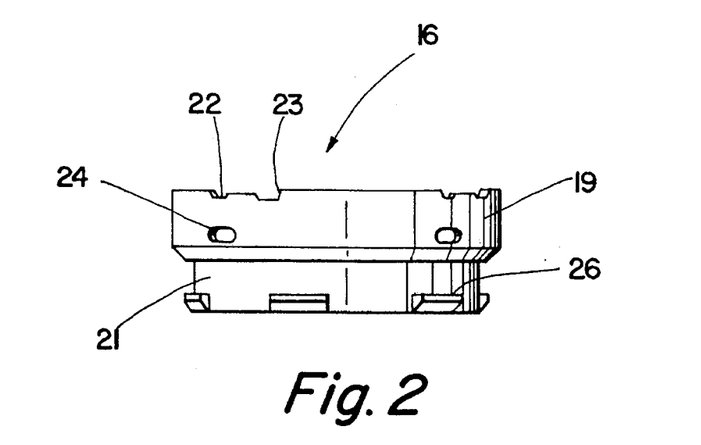
FIG. 2 is a side view of a connector retainer of one embodiment of the present invention.
Figure 3:
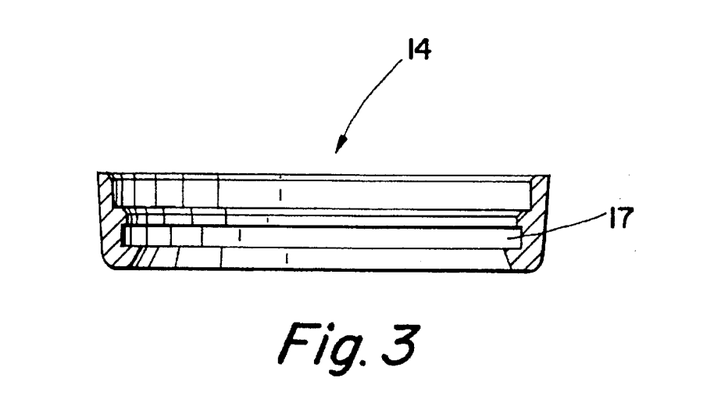
FIG. 3 is a cross-sectional view of a component of the assembly of one embodiment of the present invention.

FIG. 1 is a cross-sectional view of an airplane reading lamp bezel assembly 10 of the present invention showing a lens 12, a bezel 14, a bezel retainer 16, a lens retainer 18 and a pad 20. The bezel retainer 16 is shown more clearly in FIG. 2. Spring retaining detents are disclosed at 22 and 23 (first detent 22 and second detent 23 respectively) and bezel tabs are shown at 24. Bezel retaining latches are shown at 26. The bezel retainer 16 as shown in FIG. 2, has first axial extent 19 and a second axial extent 21. FIG. 3 shows the bezel at 14. An internal annular groove for receiving the latches is shown at 17. Bezel retaining latches 26 snap into the internal annular groove 17 when assembled and allow the bezel 14 and the bezel retainer 16 to rotate freely with respect to each other.

Figure 4:
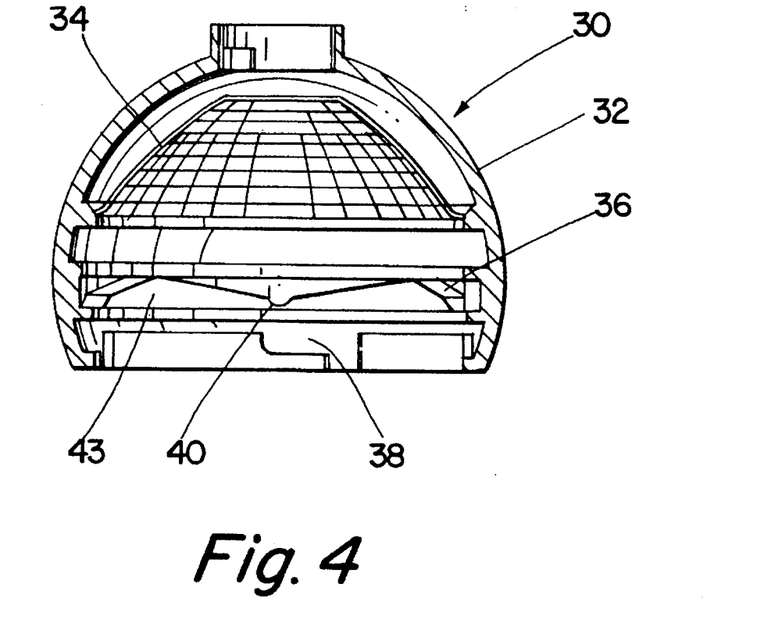
FIG. 4 is a cross-sectional view of a lamp housing assembly of one embodiment of the present invention showing a spring washer.

Referring now to FIG. 4, a cross-sectional view of the lamp housing assembly is shown at 30. The lamp housing is shown at 32, the lamp reflector is shown at 34 and the wave spring washer is shown at 36. Lamp housing 32 has slots 38 for receiving bezel retainer tabs 24 (see FIG. 2). Spring washer 36 has a series of spring tabs 40 to be received by spring retaining detents 22, 23

Figure 5:
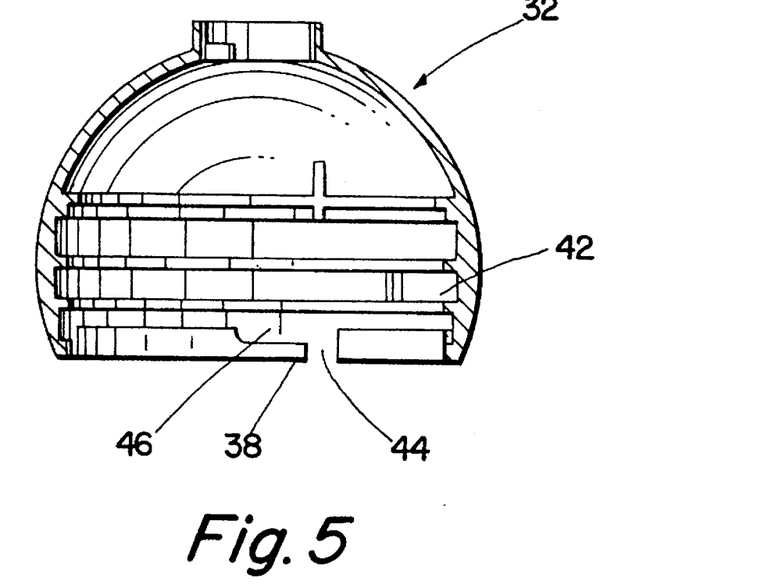
FIG. 5 is a cross-sectional view of the lamp housing of FIG. 4.

FIG. 5 more clearly shows the lamp housing 32 without the lamp reflector 34 and spring washer 36. The spring washer slot is shown at 42. The spring washer slot 42 receives spring washer 36. The washer 36 is retained within the internal annular groove 43 of the housing 32. A lamp housing slot can also be seen at 38. The lamp housing slot has an opening adjacent to the housing brim 15 at 44 and an integral circumferential slot 46. The housing brim 45 is best illustrated in FIG. 7.

Figure 6:
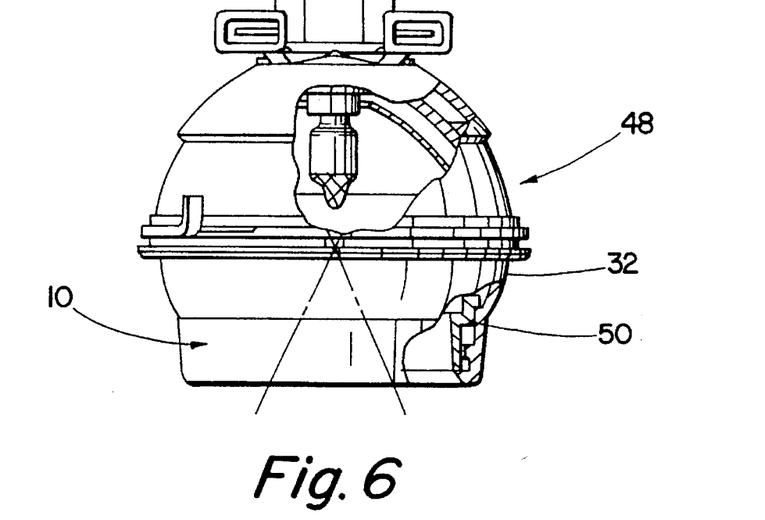
FIG. 6 is a partial cutaway view of the tamper resistant lamp assembly of the present invention.

Referring now to FIG. 6, the reading lamp assembly of the present invention is shown at 48. The lamp housing 32 is shown in a retaining relationship with the bezel assembly 10. Bezel retainer 16 is shown with bezel tabs 24 in a slot of the lamp housing 32 at 50.

Figure 7:
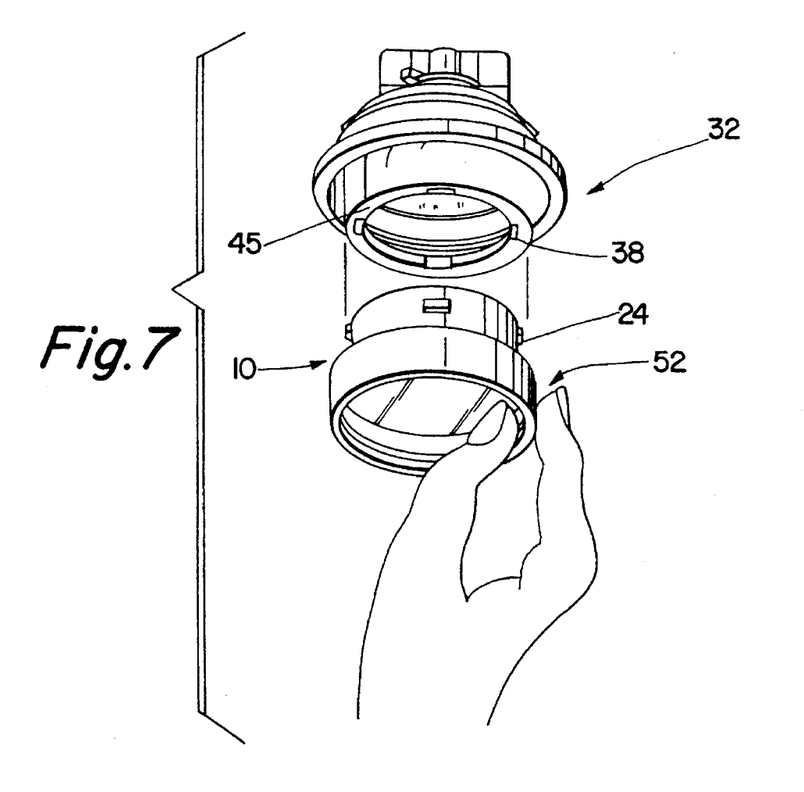
FIG. 7 is an exploded view of one embodiment of the present invention showing a method of assembly and removal of the bezel assembly from the lamp housing assembly.
Figure 9:
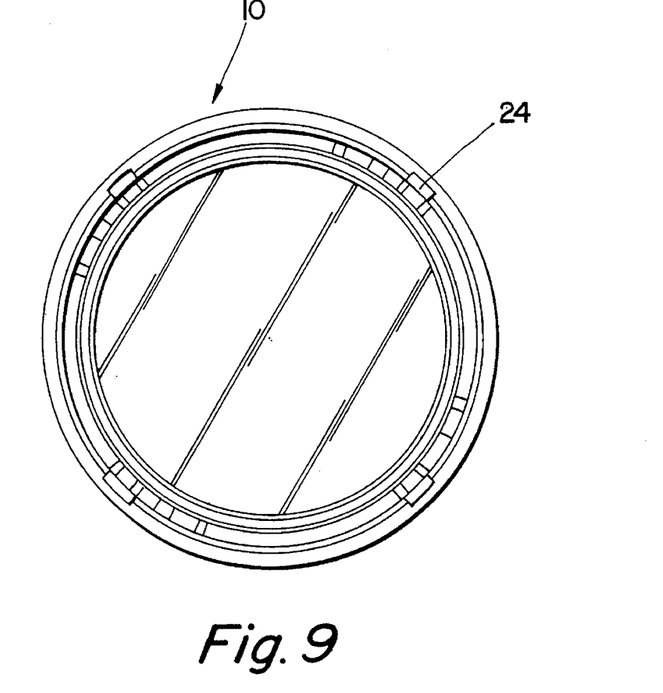
FIG. 9 is a top view of the bezel assembly for FIG.7.
Figure 10:
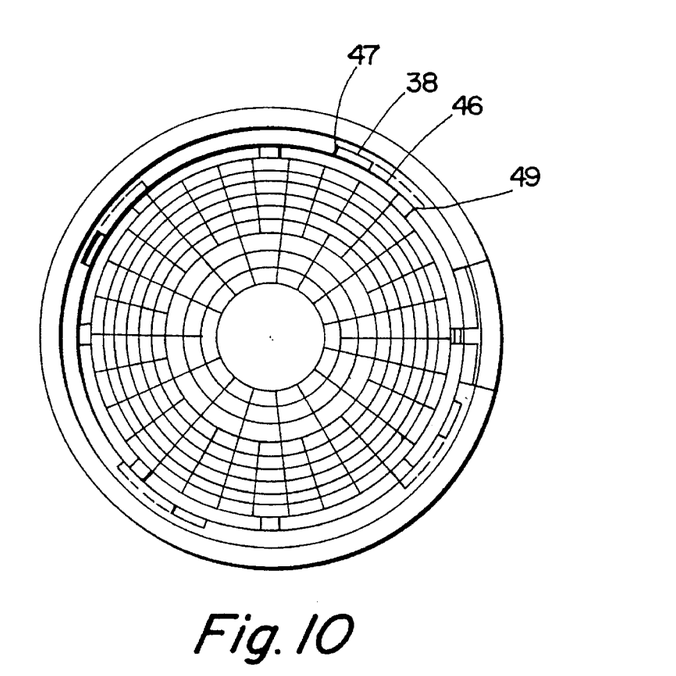
FIG. 10 is a view of the lamp housing assembly.

Assembly and disassembly of the reading lamp assembly of the present invention may be seen in FIG. 7. For assembly, the thumb and forefinger are used to grasp the bezel assembly 10 as shown. The bezel retainer 16 and the bezel 14 are squeezed together at 52 and the bezel tabs 24 are aligned with the slots 38 of the lamp housing 32. The bezel assembly 10 is then inserted into the lamp housing 32 and rotated until the spring tabs 40 are received by the spring retaining detents 22,23 of the bezel retainer 16. Disassembly is simply the reverse of the above procedure. FIGS. 9 and 10 better illustrate the assembly of the bezel assembly with the lamp housing assembly 30. FIG. 9 is the top view of the bezel assembly 10. FIG. 10 is the bottom view of the lamp housing assembly 30. Assembly of the reading lamp is accomplished by aligning the bezel tabs 24 of FIG. 9 with the lamp housing slots 38 of FIG. 10. (by aligning the "A—A" arrows in FIGS. 9 and 10.) FIG. 10 also illustrates the integral circumferential slots 46 with a first circumferential extent 47 and a second circumferential extent 49. The bezel tabs 24 are then inserted into the lamp housing 32. Once inserted the bezel tabs 24 abut the first circumferential extents 47 of the integral circumferential slots 46. In this position, the second detents 23 receive the spring tabs 40. The bezel assembly 10 is then rotated until the spring tabs 40 are received by the first detent 22. In this position, the bezel tabs 24 abut the second circumferential extent 49 of the integral circumferential slots 46. Again, disassembly is the reverse of the above procedure.

Figure 8:
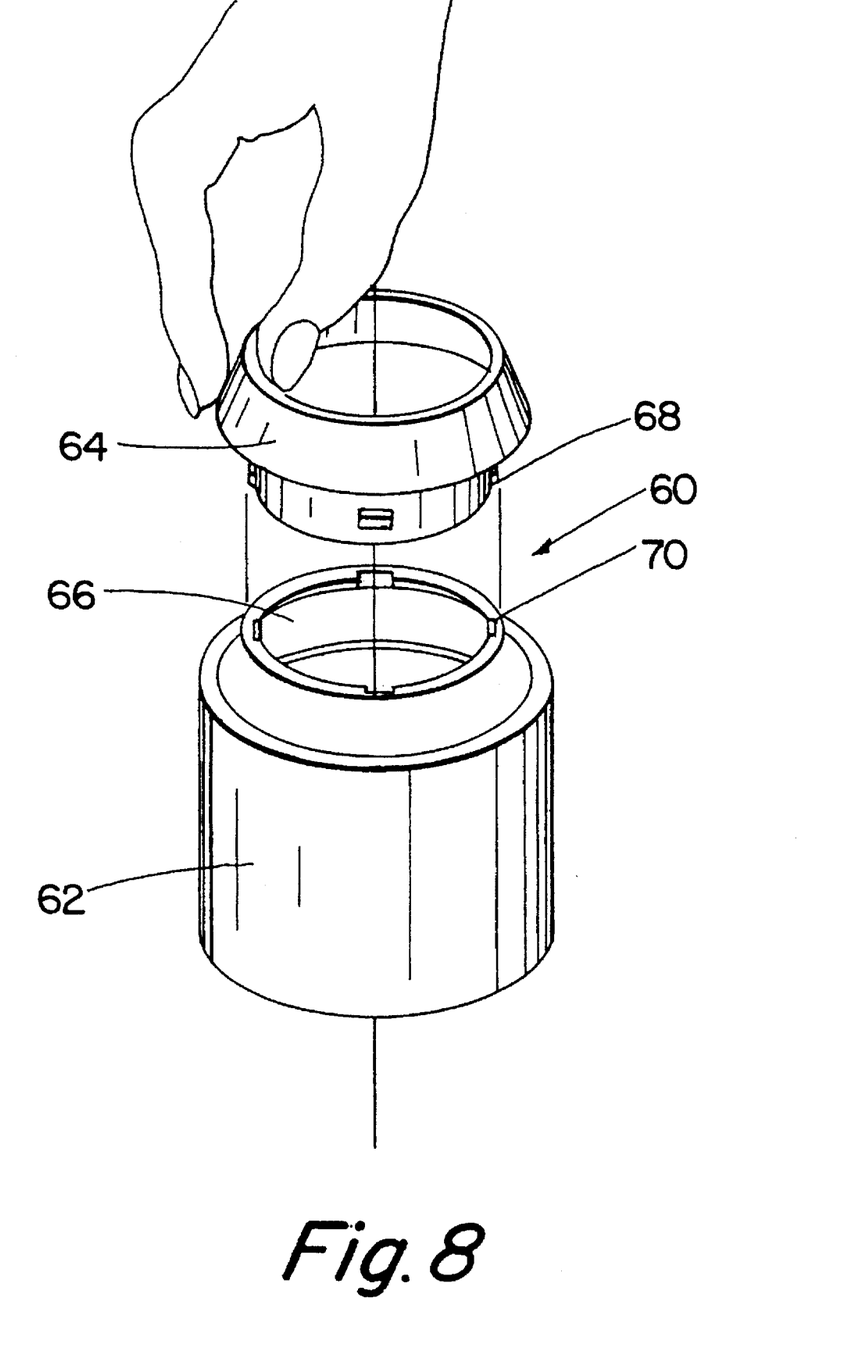
FIG. 8 is a cross-sectional view of a connector assembly of a second embodiment of the present invention.

FIG. 8 shows an alternate embodiment of the present invention as applied to a container assembly 60. Container 62 may be used for enclosing items that require tamper protection such as pharmaceutical products. In this embodiment the top or lid 64 of the container 62 is configured analogously to the bezel assembly 10 as shown in FIG. 1. Container 62 has an opening 66 configured to receive lid 64 analogously to the lamp housing 32 shown in FIG. 6. Closure and opening of the container proceeds similarly to the assembly and disassembly of the reading lamp assembly shown in FIG. 7. The thumb and forefinger grasp the lid 64. Then lid tabs 68 are aligned with the container slots 70. The lid 64 is then inserted into the container opening 66 and rotated until the spring tabs (not shown) housed within container 62 are received by detents of the lid 64. Opening the container assembly proceeds by reversing the above steps.

The scope of the invention is not to be considered limited by the above disclosure, and modifications are possible without departing from the spirit of the invention as evidenced by the following claims.

What is claimed is:

1. A tamper resistant connector assembly, comprising:
   a housing having at least one internal slot and an internal annular groove;
   a washer within said housing having at least one spring tab extending therefrom;
   a first cylinder having at least one detent on a first axial extent of said first cylinder, at least one cylinder tab extending radially from an outer surface of said first cylinder adapted to be received by said internal slot and at least one latch extending radially from said outer surface, said at least one detent configured to receive said spring tab and said cylinder tab configured to be received by said internal slot; and
   a second cylinder having an internal annular groove for receiving said latch.

2. The tamper resistant assembly of claim 1, wherein said internal slot has an axial opening to a housing brim and an integral circumferential slot.

3. The tamper resistant assembly of claim 2, wherein said slot has a first and second circumferential extent, wherein said first circumferential extent is adjacent to said axial opening.

4. The tamper resistant assembly of claim 1, wherein said cylinder tab is adjacent said first axial extent of said first cylinder.

5. The tamper resistant assembly of claim 1, wherein said internal annular groove of said housing is adjacent to said internal slot.

6. The tamper resistant assembly of claim 1, wherein said washer is retained within said housing internal annular groove.

7. The tamper resistant assembly of claim 1, wherein said at least one detent comprises a first detent and a second detent, wherein said first detent is axially aligned with said cylinder tab, wherein said second detent receives said spring tab when said cylinder tab is axially aligned with said internal slot and abuts a first circumferential extent of said internal slot, and wherein said first detent receives said spring tab when said cylinder tab abuts a second circumferential extent of said internal slot.

8. The tamper resistant assembly of claim 1, wherein said latch is adjacent to a second axial extent of said first cylinder.

9. A tamper resistant assembly, comprising:
   a hemispherical hollow housing having at least one internal housing slot adjacent to a housing brim and an internal annular groove adjacent to said housing slot, wherein said housing slot has an axial opening adjacent to said housing brim and an integral circumferential slot, wherein said slot has a first and second circumferential extent, wherein said first circumferential extent is adjacent to said axial opening;
   a wave spring washer retained within said housing annular groove having at least one spring tab extending perpendicularly therefrom;
   a first cylinder having at least one pair of detents on a first axial extent, at least one cylinder tab extending radially from an outer surface adjacent said first axial extent and at least one latch extending radially from said outer surface adjacent to a second axial extent, wherein said cylinder tab is adapted to be received by said housing slot, wherein said pair of detents comprise a first detent and a second detent, wherein said first detent is axially aligned with said cylinder tab, wherein said second detent receives said spring tab when said cylinder tab is axially aligned with said axial opening and abuts said first circumferential extent of said housing slot, wherein said first detent receives said spring tab when said cylinder tab abuts said second circumferential extent of said housing slot; and
   a second cylinder having an internal annular groove for receiving said first cylinder latch.

10. A tamper resistant reading lamp assembly, comprising:
    a hemispherical hollow lamp housing having four internal housing slots adjacent to a housing brim and an internal annular groove adjacent to said housing slots, wherein each of said housing slots has an axial opening adjacent to said housing brim and an integral circumferential slot, wherein said slot has a first and second circumferential extent, wherein said first circumferential extent is adjacent to said axial opening;
    a wave spring washer retained within said housing annular groove having four spring tabs extending perpendicularly therefrom;

a cylindrical bezel retainer having four pairs of detents on a first axial extent, four retainer tabs extending radially from an outer surface adjacent said first axial extent and six retainer latches extending radially from said outer surface adjacent to a second axial extent, wherein each of said retainer tabs are adapted to be received by said housing slots, wherein each of said pair of detents comprise a first detent and a second detent, wherein each of said first detent is axially aligned with one of said retainer tabs, wherein each of said second detents receive said spring tabs when said retainer tabs are axially aligned with said axial opening and abut said first circumferential extent of said housing slot, wherein each of said first detents receive said spring tabs when said retainer tabs abut said second circumferential extent of said housing slot; and a cylindrical bezel having an internal annular groove for receiving said bezel retainer latches.

* * * * *

UNITED STATES PATENT AND TRADEMARK OFFICE
CERTIFICATE OF CORRECTION

Page 1 of 2

PATENT NO. : 5,560,707
DATED : October 1, 1996
INVENTOR(S) : Donald A. Neer

It is certified that error appears in the above-indentified patent and that said Letters Patent is hereby corrected as shown below:

In column 2, line 19, please delete the word "and".

In column 2, line 22, please delete "for FIG. 7;" and replace with --of FIG. 7; and--.

In column 2, line 23, after "FIG. 10 is a", please add the word --bottom--.

In column 2, line 23, please delete "assembly:" and replace with --assembly.--.

In column 2, line 36, immediately following "bezel retainer 16", please add a comma.

In column 2, line 49, immediately following "23", please add a period.

In column 2, line 56, please delete "15" and replace it with --45--.

UNITED STATES PATENT AND TRADEMARK OFFICE
CERTIFICATE OF CORRECTION

PATENT NO. : 5,560,707
DATED : October 1, 1996
INVENTOR(S) : Donald A. Neer

It is certified that error appears in the above-indentified patent and that said Letters Patent is hereby corrected as shown below:

In column 3, line 7, the sentence beginning with "FIGS. 9 and 10" should be the start of a new paragraph.

Signed and Sealed this

Twenty-eighth Day of January, 1997

Attest:

BRUCE LEHMAN

*Attesting Officer*    *Commissioner of Patents and Trademarks*